Patented May 14, 1940

2,200,564

UNITED STATES PATENT OFFICE 2,200,564

INSECTICIDE

Milton S. Schechter and Herbert L. J. Haller, Washington, D. C., assignors to Henry A. Wallace, as Secretary of Agriculture of the United States of America, and his successors in office No Drawing. Application December 8, 1939, Serial No. 308,234

1 Claim. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America, for governmental purposes, without the payment to us of any royalty thereon.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which can be used in place of lead arsenate and other arsenicals for destroying insects, without leaving a harmful residue on fruits and vegetables.

We have found that an organic compound known as phthalonitrile, or o-cyanobenzonitrile, or 1,2-dicyanobenzene, having the formula

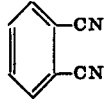

is very effective in killing many species of insects whether applied externally or internally; that this product may be sprayed or dusted upon vegetation without injuring it.

Phthalonitrile is a colorless, crystalline solid that melts at 141° C.; it is insoluble in water but is soluble in organic solvents. This compound may be applied in a manner similar to that in which insecticides in general are used, that is, as dusts, or in the form of solutions or suspensions in various media, such as water, kerosene, etc., and either with or without the use of spreaders, wetting agents, or sticking agents.

The value of phthalonitrile as an insecticide is shown by the following tests:

1. Upon such insects as the melon worm, the southern beet webworm, and the Hawaiian beet webworm, as a dust in a concentration of 0.310 mg. per sq. cm. of foliage, the mortality after 48 hours was 100% in each case.

2. Upon the diamond-back cabbage worm, the southern army worm, and the Colorado potato beetle, as a dust in a concentration of 0.300 mg. per sq. cm. of foliage, the mortality after 48 hours was 100% in each case.

3. Upon the yellow bear, and the celery leaf tier, as a dust in a concentration of 0.300 mg. per sq. cm. of foliage, the mortality after 48 hours was 90% and 87% respectively.

4. Upon the codling moth larvae as a spray in a concentration of 2 lbs. per 50 gallons, phthalonitrile gave 43.4% clean fruit, 3.8% stings, and 52.8% wormy fruit. Lead arsenate in a concentration of 2 lbs. per 50 gallons when sprayed on codling moth larvae in the same way gave 51.0% clean fruit, 16.7% stings, and 32.3% wormy fruit.

5. Phthalonitrile has also been found to be very toxic to the screw worm (*Cochliomyia americana*).

The above examples are not to be construed as limiting either the method of application of this insecticide or the kinds of insects to which it may be applied.

Having thus described our invention, what we claim for Letters Patent is:

We claim:

An insecticide containing as its essential active ingredient phthalonitrile.

MILTON S. SCHECHTER.
HERBERT L. J. HALLER.